United States Patent [19]
Kuriya

[11] Patent Number: 5,772,808
[45] Date of Patent: Jun. 30, 1998

[54] RADIAL TIRE WITH THREE LAYER MULTI-SHEATH STEEL CARCASS CORDS

[75] Inventor: Yoshinori Kuriya, Kodaira, Japan

[73] Assignee: Bridgestone Corporation, Tokyo, Japan

[21] Appl. No.: 909,852

[22] Filed: Aug. 12, 1997

Related U.S. Application Data

[62] Division of Ser. No. 576,338, Dec. 21, 1995, Pat. No. 5,697,204.

[30] Foreign Application Priority Data

Dec. 26, 1994 [JP] Japan .................................. 6-322928
Dec. 13, 1995 [JP] Japan .................................. 7-324911

[51] Int. Cl.⁶ .............................. B60C 9/00; B60C 9/02; B60C 9/04; B60C 9/08
[52] U.S. Cl. ........................ 152/454; 152/451; 152/556
[58] Field of Search ........................ 57/902, 210, 212, 57/213; 152/451, 556, 454

[56] References Cited

U.S. PATENT DOCUMENTS

| | | | |
|---|---|---|---|
| 4,651,513 | 3/1987 | Dambre | 57/902 |
| 4,781,016 | 11/1988 | Sato et al. | 57/213 |
| 4,840,213 | 6/1989 | Koseki | 152/454 |
| 5,074,345 | 12/1991 | Penant | 57/902 |
| 5,261,473 | 11/1993 | Penant | 57/902 |

FOREIGN PATENT DOCUMENTS 2-229287  9/1990  Japan ...................................... 57/213

OTHER PUBLICATIONS

"High Tensile Strength Steel Cord Construction for Tyres," Research Disclosure, Aug. 1992, No. 340, Emsworth, GB, pp. 624–633.

*Primary Examiner*—Adrienne C. Johnstone
*Attorney, Agent, or Firm*—Sughrue, Mion, Zinn, Macpeak & Seas, PLC

[57] ABSTRACT

A steel cord for the reinforcement of rubber article has a three-layer twisting construction comprising a core layer comprised of a single steel filament, a first sheath layer comprised of six steel filaments and a second sheath layer comprised of steel filaments subtracted by 1 or 2 filament from maximum steel filament number arranged on a circumscribed circle of the first sheath layer without a wrap filament. In this steel cord, filament diameters of the core layer and the sheath layers satisfy the particular relationships. The steel cord is used in a carcass ply of a heavy duty pneumatic radial tire.

4 Claims, 1 Drawing Sheet

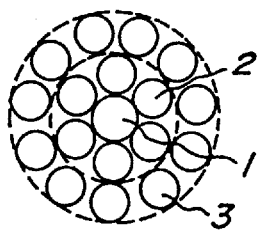
FIG_1
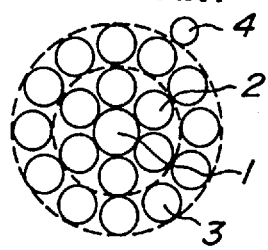
FIG_2
PRIOR ART
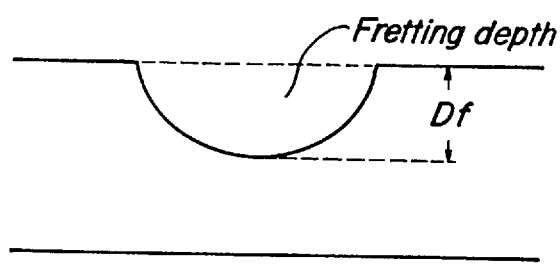
FIG_3

RADIAL TIRE WITH THREE LAYER MULTI-SHEATH STEEL CARCASS CORDS

This is a divisional of application Ser. No. 08/576,338 filed Dec. 21, 1995 now U.S. Pat. No. 5,697,204.

BACKGROUND OF THE INVENTION

1. Field of the Invention

This invention relates to steel cords having improved fatigue resistance and retention of tensile strength as well as heavy duty pneumatic radial tires for truck and bus and light truck having improved tire durability by using such steel cords as a carcass ply cord.

2. Description of the Related Art

In general, steel filaments constituting the steel cord fret with each other during running of the tire, so that the sectional area of the steel filament is reduced due to fretting to lower the tensile strength of the steel cord.: If the reduction of the sectional area in the steel filament is violent only in a portion of the cord, such a steel filament is apt to be broken by shock in tension or repetitive bending. Once the steel filament is broken, the tensile stress in the remaining steel filaments increases and hence fatigue breakage of the steel cord is undesirably promoted.

In order to enhance the durability of the steel cord, it is necessary to avoid premature breakage of steel filaments in a portion of the steel cord. That is, it is desirable to uniformly decrease the strengths of the steel filaments in the cord.

The inventors have examined the decrease of filament strength in the carcass ply cord during the running of the tire with respect to steel cords having a layer twisting construction and stabilized by spirally wrapping a wrap filament, and confirmed that the decrease of filament strength in an outermost sheath layer of the cord is extremely large and results mainly from fretting with the wrap filament.

Now, the inventors have further examined the steel cords removing the wrap filament therefrom for the prevention of the fretting, and confirmed that the decrease of filament strength in the outermost sheath layer of the cord is less because the fretting with wrap filament is not caused owing to the absence of the wrap filament.

Since the wrap filament is not used, however, the binding of the cord becomes poor and the steel filaments constituting the cord become scattered when the cord is extremely bent. As a result a phenomenon of breaking the steel filament when abnormal input is applied to a portion of the steel filaments is observed in the cord of two layer twisting construction. In this case, the breaking life of the cord is largely shortened as compared with the stabilized steel cord wrapped with the wrap filament. From this phenomenon, it is required to restrain the cord with any means in order to prevent the degradation of cord life due to extreme bending input.

In the carcass ply cord of the layer twisting construction, there is still a problem to be immediately solved as mentioned above.

SUMMARY OF THE INVENTION

It is, therefore, an object of the invention to prevent the decrease of filament strength in the outermost sheath layer of the steel cord as a carcass ply cord by mitigating fretting between the wrap filament and the steel filament in the outermost sheath layer while maintaining the binding of the steel filaments in the cord and controlling the abnormal input to the steel filament during the large bending of the cord.

According to the invention, there is the provision of a steel cord for the reinforcement of rubber article having a three-layer twisting construction comprising a core layer comprised of a single steel filament, a first sheath layer comprised of six steel filaments arranged around the core layer and a second sheath layer comprised of steel filaments subtracted by 1 or 2 filament from maximum steel filament number arranged on a circumscribed circle of the first sheath layer, in which these steel filaments in the first and second sheath layers are twisted in the same twisting direction at a different twisting pitch without using a wrap filament, and filament diameters of the core layer and the sheath layers satisfy the following relationships:

$$Ds < Dc \leq 0.20$$

$$Ds \times 1.06 \leq ((Dc+Ds) \times \pi)/6 \leq Ds \times 1.1$$

wherein Ds is a filament diameter of the sheath layers (mm) and Dc is a filament diameter of the core layer (mm).

In a preferable embodiment of the invention, the above steel cords are applied to a carcass ply in a heavy duty pneumatic radial tire having an aspect ratio of not more than 80%, whereby the decrease of filament strength due to fretting between the steel filament in the outermost sheath layer and the wrap filament can be controlled while maintaining the binding of the steel filaments in the cord.

BRIEF DESCRIPTION OF THE DRAWINGS

The invention will be described with reference to the accompanying drawings, wherein:

FIG. 1 is a diagrammatically sectional view of an embodiment of the steel cord having a 1+6+11 layer twisting construction according to the invention;

FIG. 2 is a diagrammatically sectional view of the steel cord having a 1+6+12+1 layer twisting construction as a comparative example; and FIG. 3 is a schematic view showing a fretting depth of a steel filament.

DESCRIPTION OF THE PREFERRED EMBODIMENTS

In this type of the layer twisted cord, the non-uniformity in the decrease of filament strength, particularly the extreme decrease of filament strength in the outermost sheath layer of the cord during the running of the tire is due to the fact that the twisting direction of the wrap filament is different from the twisting direction of the steel filament in the outermost sheath layer. Because, the contact area between the steel filament in the outermost sheath layer and the wrap filament is small and the contact pressure per unit area becomes large.

Further, the torsional input is created in the carcass ply cord at the ground contact region of the tire in the longitudinal direction during the running of the tire. If the torsional input is created in a direction disentangling the twisted structure of the outermost sheath layer, the torsional input is created in the wrap filament in a more twisting direction to cause relative movement between the steel filament and the wrap filament when the twisting direction of the wrap filament is different from the twisting direction of the steel filament in the outermost sheath layer. When the large relative movement is caused in addition to the large contact pressure, fretting between the wrap filament and the steel filament in the outermost sheath layer is promoted to reduce the sectional area of the steel filament and hence the decrease of filament strength in the outermost sheath layer is caused.

Similarly, when the twisting directions of the first sheath layer and the second sheath layer in the cord are opposite, the contact pressure between the steel filaments of these layers becomes large to promote fretting between these steel filaments and hence the sectional area of the steel filament is reduced to cause the decrease of filament strength in these sheath layers.

Furthermore, the plated film formed on the surface of the steel filament is peeled off at a portion reducing the sectional area of the steel filament (fretted portion), and hence the steel filament is apt to be corroded at this portion, which badly affects the resistance to corrosion fatigue in the cord.

When the steel cord of the layer twisting construction is formed by twisting the steel filaments of the first and second sheath layers in the same direction without the use of the wrap filament, the decrease of filament strength is not caused. However, when the steel filaments are closely arranged in each sheath layer, if a large bending force is applied to the cord as previously mentioned, these steel filaments become scattered and abnormal input is created in a part of these steel filaments to cause the breakage of the steel filament, whereby the breaking life of the cord is undesirably shortened.

On the contrary, in the steel cord according to the invention, the number of steel filaments in the outermost sheath layer (second sheath layer) is made smaller by 1 or 2 filaments than the maximum number of steel filaments closely arranged on a circumscribed circle of the innermost sheath layer (first sheath layer), so that the steel filaments of the outermost sheath layer are restrained by coating rubber that penetrates into gaps between the steel filaments of the outermost sheath layer to develop the effect substantially equal to the use of the wrap filament. That is, the decrease of filament strength can be suppressed to control the shortening of the breaking life of the cord in the application of a large bending force.

According to the invention, the steel cord is preferable to have a 1+6+11 three-layer twisting construction as shown in FIG. 1.

If the number of steel filaments in the outermost sheath layer is smaller by 3 or more filaments than the maximum number of steel filaments closely arranged on a circumscribed circle of the innermost sheath layer, the deviation of the steel filaments is apt to be caused in the outermost sheath layer and the production of such a cord becomes very difficult.

When six steel filaments as a first sheath layer are twisted around a single steel filament as a core layer, if all of these steel filaments have the same filament diameter, the sectional shape of the first sheath layer is substantially ellipsoidal due to twisting of these steel filaments around the core, so that the contact pressure between the steel filaments of the first sheath layer increases to lower the fatigue resistance of the steel filaments in the first sheath layer.

Therefore, it has been confirmed that it is effective to prevent the degradation of fatigue resistance by making the filament diameter in the core layer thicker than the filament diameter in the first sheath layer to lower the contact pressure between the filaments of the first sheath layer. However, if the difference of the filament diameter between the core layer and the first sheath layer is too large, the steel filaments of the first sheath layer are easy to move around the core layer and hence the wearing of the core layer by fretting with these steel filaments increases to lower the fatigue resistance of the core layer. In order to solve this problem, according to the invention, the filament diameters in the core layer and the first sheath layer are necessary to satisfy the following relationships:

$$Ds < Dc \leq 0.20$$

$$Ds \times 1.06 \leq ((Dc+Ds) \times \pi)/6 \leq Ds \times 1.1$$

wherein Ds is a filament diameter of the sheath layer (mm) and Dc is a filament diameter of the core layer (mm).

As the filament diameter becomes thicker even in the above cord, if an extremely large bending force is applied to the cord, breakage of the filament is caused. In order to prevent such breakage, it is effective to reduce the surface strain of the steel filament. In general, the surface strain $\epsilon$ of the steel filament is approximated to $\epsilon = D/2R$ (where D is a filament diameter, and R is a radius of curvature in the bending of the cord). That is, in order to reduce the surface strain $\epsilon$ of the steel filament under a constant bending force R, it is effective to make the filament diameter D as thin as possible.

In this connection, the inventors have confirmed from various experiments that the filament diameter causing no breakage of the steel filament is necessary to be not more than 0.20 mm when an extremely large bending force is applied to the carcass ply cord in a heavy duty pneumatic radial tire, particularly a low-section profile pneumatic radial tire having an aspect ratio of not more than 80%. That is, when the filament diameter exceeds 0.20 mm, the surface strain undesirably increases.

In order to ensure the necessary cord strength by making the filament diameter as thin as possible, according to the invention, two sheath layers are disposed around the core layer. If three or more sheath layers are formed on the core layer, the twisting construction becomes more complicated, and particularly it is very difficult to form these sheath layers in the same twisting direction. Moreover, it is favorable to use so-called high strength steel wire filament having a tensile strength of not less than 333 kg/cm$^2$ as the steel filament.

The following examples are given in illustration of the invention and are not intended as limitations thereof.

There are provided several low-section profile radial tires for truck and bus to be tested, each having a tire size of 11/70R22.5 14PR.

In the tire according to the invention, a steel cord of three-layer twisting construction as shown in Table 1 and FIG. 1 (1+6+11 twisting construction) is used at an end count of 22 cords/5 cm in a radial carcass ply, in which numeral 1 is a steel filament constituting a core layer, numeral 2 a steel filament constituting a first sheath layer and numeral 3 a steel filament constituting a second sheath layer. In the comparative tires, a steel cord of three-layer twisting construction provided with a wrap filament (1+6+12+1 twisting construction) as shown in Table 1 and FIG. 2 (numeral 4 is a wrap filament) is used in Comparative Example 1, and a steel cord of 1+6+12 twisting construction as shown in Table 1 is used in Comparative Example 2, and steel cords of 1+6+11 twisting construction not satisfying the relationship of filament diameter between core layer and sheath layer defined in the invention are used in Comparative Examples 3–5, respectively.

The retention of tensile strength of the cord after the usual running, and percentage of filament breakage and fretting depth after the running under a large bending force are measured with respect to these test tires by the following evaluation methods to obtain results as shown in Table 1.

(1) Retention of tensile strength in cord

The test tire subjected to an internal pressure of 8 kgf/cm² is run on a drum at a speed of 60 km/h under a JIS 100% load according to usual manner. Thereafter, 10 carcass ply cords are taken out from the tire, and breaking strengths thereof are measured by means of an Instron type tensile testing machine to determine an average value thereof. The retention of tensile strength of the cord is evaluated by dividing the above average value by an average value of breaking strengths of 10 cords taken out from a new tire.

(2) Fretting depth

After the test tire is usually run on the drum under the above conditions, the carcass ply cord is taken out from the tire and then two steel filaments are taken out from each layer constituting the cord. Thereafter, the reduction of filament diameter due to the fretting or fretting depth Df as shown in FIG. 3 is measured in a region of 14.5 cm±2 cm centering around an equatorial plane to obtain results as shown in Table 1, in which a maximum value is adopted for the comparison.

(3) Percentage of filament breakage

After the test tire subjected to an internal pressure of 1 kgf/cm² is run on the drum at a speed of 60 km/h under a JIS 40% load (i.e. condition of large bending force) over a distance of 10,000 km, 10 carcass ply cords are taken out from the tire, and then the number of broken filaments is measured. The percentage of filament breakage is represented by a percentage of dividing the number of broken filaments by total filaments of 10 cords. The smaller the numerical value, the better the percentage of filament breakage.

As mentioned above, in the steel cord according to the invention, the wearing of the steel filaments in the outermost sheath layer of the cord due to the fretting with the wrap filament is reduced owing to the absence of the wrap filament and the decrease of the filament strength in the cord is suppressed to improve the service life of the cord. When the steel cord according to the invention is applied to the carcass ply of the heavy duty pneumatic radial tire, the tire durability is more improved.

What is claimed is:

1. A heavy duty pneumatic radial tire having an aspect ratio of not more than 80% and a carcass ply of steel cords having a three-layer twisting construction devoid of any wrap filament, each steel cord comprising:

a core layer of a single steel filament, a first sheath layer of six steel filaments arranged around the core layer, and a second sheath layer of steel filaments numbering 1 or 2 filaments less than a maximum number of the same steel filaments that are arranged on a circumscribed circle of the first sheath layer, said steel filaments in said second sheath layer having the same diameter as that of said steel filaments in said first sheath layer, wherein said steel filaments in said first and second sheath layers are twisted in the same twisting direction at a different twisting pitch, and wherein filament diameters of said core layer and said first and second sheath layers satisfy the relationships $$Ds < Dc \leq 0.20$$

$$Ds \times 1.06 \leq ((Dc+Ds) \times \pi)/6 \leq Ds \times 1.1$$

where Ds is the filament diameter of the sheath layers in millimeters and Dc is the filament diameter of the core layer in millimeters.

2. A heavy duty pneumatic radial tire according to claim 1, wherein the steel filaments are each a high strength steel wire filament having a tensile strength of not less than 330 kg/cm².

3. A heavy duty pneumatic radial tire according to claim 1, wherein said three-layer twisting construction is 1+6+11.

TABLE 1

|  | Example 1 | Comparative Example 1 | Comparative Example 2 | Example 2 | Example 3 | Comparative Example 3 | Comparative Example 4 | Comparative Example 5 |
|---|---|---|---|---|---|---|---|---|
| Twisting construction | 1 + 6 + 11 | 1 + 6 + 12 + 1 | 1 + 6 + 12 | 1 + 6 + 11 | 1 + 6 + 10 | 1 + 6 + 11 | 1 + 6 + 11 | 1 + 6 + 11 |
| Filament diameter (mm) | 0.185/0.17/0.17 | 0.185/0.17/0.17/0.15 | 0.185/0.17/0.17 | 0.165/0.155/0.155 | 0.185/0.17/0.17 | 0.17/0.17/0.17 | 0.20/0.17/0.17 | 0.23/0.21/0.21 |
| Ds × 1.06 | 0.1802 | 0.1802 | 0.1802 | 0.1643 | 0.1802 | 0.1802 | 0.1802 | 0.2226 |
| Ds × 1.10 | 0.1870 | 0.1870 | 0.1870 | 0.1705 | 0.1870 | 0.1870 | 0.1870 | 0.2310 |
| ((Ds + Dc) × π)/6 | 0.1859 | 0.1859 | 0.1859 | 0.1675 | 0.1859 | 0.1780 | 0.1937 | 0.2304 |
| Judgment of condition*1 | ○ | ○ | ○ | ○ | ○ | X | X | ○ |
| Twisting direction | ∞/S/S | ∞/S/S/Z | ∞/S/S | ∞/S/S | ∞/S/S | ∞/S/S | ∞/S/S | ∞/S/S |
| Twisting pitch (mm) | ∞/5.5/11 | ∞/5.5/11/3.5 | ∞/5.5/11 | ∞/5.5/11 | ∞/5.5/11 | ∞/5.5/11 | ∞/5.5/11 | ∞/6/12 |
| Retention of tensile strength in cord | 99 | 86 | 97 | 99 | 98 | 92 | 94 | 98 |
| Fretting depth (max: μm)*2 | 9 (second sheath) | 34 (second sheath) | 9 (second sheath) | 8 (second sheath) | 10 (second sheath) | 18 (first sheath) | 22 (first sheath) | 10 (second sheath) |
| Percentage of filament breakage (%) | 0 | 0 | 21 | 0 | 0 | 0 | 1 | 78 |

*1: Ds × 1.06 ≦ ((Ds + Dc) × π)/6 ≦ Ds × 1.10, ○ satisfy, X not satisfy
*2: The parenthesis in fretting depth indicates the position of steel filament showing maximum value.

4. A heavy duty pneumatic radial tire according to claim 1, wherein said three-layer twisting construction is 1+6+10.

* * * * *